United States Patent
Wilkes et al.

(10) Patent No.: US 8,595,068 B1
(45) Date of Patent: Nov. 26, 2013

(54) PORTFOLIO MANAGEMENT SYSTEM

(75) Inventors: T. Clay Wilkes, North Salt Lake, UT (US); Matt Bentley, Salt Lake City, UT (US); Brijesh Garabadu, Salt Lake City, UT (US)

(73) Assignee: Galileo Processing, Inc., Salt Lake City, UT (US)

( * ) Notice: Subject to any disclaimer, the term of this patent is extended or adjusted under 35 U.S.C. 154(b) by 517 days.

(21) Appl. No.: 12/634,557

(22) Filed: Dec. 9, 2009

Related U.S. Application Data (60) Provisional application No. 61/120,919, filed on Dec. 9, 2008.

(51) Int. Cl.
*G06F 17/00* (2006.01)
*G06F 7/08* (2006.01)
*G06Q 30/00* (2012.01)

(52) U.S. Cl.
USPC .............. 705/14.45; 705/14.11; 705/14.13; 705/7.29; 705/26; 235/375; 235/380

(58) Field of Classification Search
USPC .......... 705/7.29, 39, 14.11, 14.13, 14.45, 26, 705/36 R; 707/734; 725/109; 235/375, 379, 235/380
See application file for complete search history.

(56) References Cited

U.S. PATENT DOCUMENTS

| | | | |
|---|---|---|---|
| 7,337,947 B1* | 3/2008 | Swanson, Sr. ............... | 235/375 |
| 7,801,891 B2* | 9/2010 | Hu et al. ...................... | 707/734 |
| 7,926,711 B2* | 4/2011 | Taylor et al. ................. | 235/379 |
| 8,090,613 B2* | 1/2012 | Kalb et al. ................... | 705/7.29 |
| 8,156,042 B2* | 4/2012 | Winkelman et al. ......... | 705/39 |
| 2009/0222870 A1* | 9/2009 | Gruber et al. ................ | 725/109 |

* cited by examiner

*Primary Examiner* — John G Weiss
*Assistant Examiner* — Marilyn G Macasiano
(74) *Attorney, Agent, or Firm* — Maschoff Brennan (57) ABSTRACT

A portfolio management system includes a method that uses multi-dimensional analysis to create a user group based on whatever characteristics the manager desires that would be the subject of a messaging campaign and that tracks user actions as a result of the messaging campaign. The method includes creating a user data set through multi-dimension analysis to define a user target base. Based on the data set, a messaging campaign is developed and one or various communication channels are selected to run the messaging campaign. A message campaign runs to target the user data set. Information is tracked from user actions after running the message campaign. Analysis of the tracked information can be generated into a report and can be used to create additional user data and messaging campaigns.

20 Claims, 4 Drawing Sheets

Figure 3

Web / IVR Promotions

| Campaign | Data Range | No. Of Impressions | No. Of Clicks (Actions) | Click % Action | Conversion | Conversion % |
|---|---|---|---|---|---|---|
| DD Enrollment | Dec 2007 | 10,000 | 1500 | 15% | - | - |
| Survey (Web) | Nov 2007 | 2,000 | 500 | 25% | 80 | 4.0% |
| Survey (IVR) | Nov 2007 | 2,500 | 600 | 28% | 150 | 6.0% |

Predictive Dialer Promotions

| Campaign | Data Range | No. Of Call Attempts | No. Of Success | Click % | Customer Completed Call | Conversion % |
|---|---|---|---|---|---|---|
| Card Activation | 01-Dec-2007 To 07-Dec-2007 | 5,550 | 1100 | 22% | 400 | 8.0% |
| Card Activation | 08-Dec-2007 To 14-Dec-2007 | 25,500 | 4,000 | 16% | 1,800 | 7.5% |

Emails / Alerts

| Campaign | Data Range | No. Of Email/ Alerts | No. Of Responses (Clicks) | Response % | Conversion | Conversion % |
|---|---|---|---|---|---|---|
| | | | | | | |

ROI Analysis

| Campaign | Data Range | No. Of Conversions / Actions | Cost Per Conversion / Action | Cost | ROI Per Action |
|---|---|---|---|---|---|
| DD Enrollment | Dec 2007 | 800 | $20 | $16,000 | $40,000 |
| Survey (Web) | Nov 2007 | 200 | $5 | $1,000 | - |
| Survey (IVR) | Nov 2007 | 350 | $5 | $1,750 | - |
| Collections | Nov 2007 | 125 | $20 | $2,500 | *$15,000 |
| Fraud Calls | Nov 2007 | 10000 | $1 | $10,000 | +$25,000 |
| Totals | | | | $31,250 | |

* Average Collection Size = $120
+ Monthly Reduction In Fraud = $15,000

Web / IVR Promotion Analysis

| Campaign | Data Range | No. Of Impressions | No. Of Clicks (Actions) | Click % Action | Conversion | Conversion % | ROI |
|---|---|---|---|---|---|---|---|
| DD Enrollment | Dec 2007 | 10,000 | 1500 | 15% | 315 | 21% | +$31,500 |

+ $100 per customer

Figure 4

PORTFOLIO MANAGEMENT SYSTEM

CROSS-REFERENCE TO RELATED APPLICATIONS

This application claims the benefit of U.S. Provisional Patent Application Ser. No. 61/120,919, filed Dec. 9, 2008, which is incorporated herein in its entirety by this reference.

BACKGROUND

1. The Field of the Invention

The present disclosure generally relates to messaging to users and tracking user actions related to such messaging and, more particularly, to a portfolio management system that uses multi-dimensional analysis to target dynamic groups, messages to such groups using multiple communication channels and uses multi-dimensional analysis to track performance of such messaging.

2. The Relevant Technology

Campaign managers that are typically used can message out through a single communication channel based on data provided by an external source and provide limited information regarding the recipient's actions such as whether the recipient received the message and opened a specific page or document. Additionally, the campaign manager would be provided with a list of users to whom the campaign would be directed. A campaign management system can benefit from implementing a portfolio management system that uses multi-dimensional analysis to create a user group based on whatever characteristics the manager desires that would be the subject of a messaging campaign and that gathers more specific marketing information from the user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one aspect of the invention, a portfolio management system includes a method that uses multi-dimensional analysis to create a user group based on whatever characteristics the manager desires that would be the subject of a messaging campaign and that tracks user actions as a result of the messaging campaign. The method includes creating a user data set through multi-dimension analysis to define a user target base. Based on the data set, a messaging campaign is developed and one or various communication channels are selected to run the messaging campaign. A message campaign runs to target the user data set. Information is tracked from user actions after running the message campaign. Analysis of the tracked information can be generated into a report and can be used to create additional user data and messaging campaigns.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The present systems and methods include various embodiments of a portfolio management system that combines multi-dimensional analysis to generate a predefined group of people to then run messaging campaign through different communication channels with a specific message. The message can refer to a product or a group of products, services, survey, or any other message. The portfolio management system can use multiple communication channels, such as phone systems, like Interactive Voice Response (IVR) or a dialer, e-mails, alerts, Web communications, like webinars, blogs, and RSS feed, postal mail, and the like. The portfolio management system can also interact with a customer service help desk to provide specific messages to the targeted group via a call line, online chat, or other customer service feature.

The system combines business intelligence with a campaign manager or messaging system, which can use a combination of communication channels, such as the Internet, a Web communication, dialer, e-mail, alerts, customer service, postal mail, IVR, and other communication methods known in the art to transmit a message to a person, group, or other entities. The system can also track the success of the messaging campaigns through business intelligence or multi-dimensional analysis in various industries, like the financial services sector.

Figure 1:
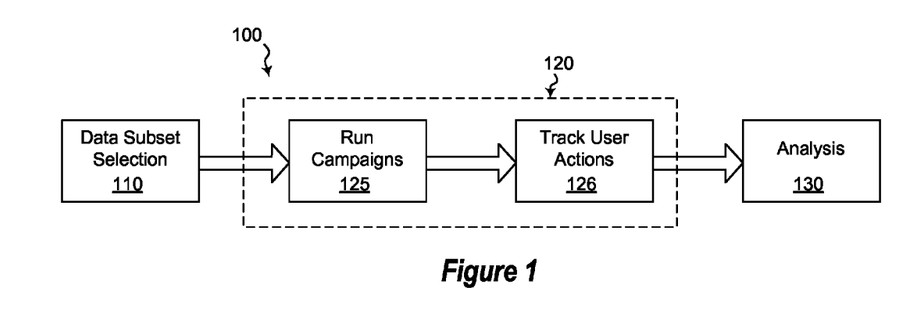
FIG. 1 illustrates a diagram or flowchart of portfolio management system components in accordance with the various embodiments on the invention.

Reference is first given to FIG. 1, which illustrates an embodiment of a portfolio management system 100. As shown, the portfolio management system includes various components. A data subset selection module 110 is configured to create a data subset as discussed in more detail below.

The portfolio management system 100 also includes a campaign management component 120. The campaign management component 120 includes a campaign coordinator component 125. The campaign coordinator component 125 runs a messaging campaign through single or multiple communication channels for a given data subset generated by data subset selection module 110. The information in the dataset can be used to determine various actions that can be specified for a given messaging campaign. For example, the information may be used to determine whether an ad banner should show up for an account, whether an Interactive Voice Response (IVR) promotion plays for a particular customer, or whether a predictive dialer calls a particular customer. It will be appreciated that various other actions may also be specified for a given campaign.

The user information is then tracked by a tracking component 126 of the management system 120 to determine what actions the user took after running the messaging campaign. For example, if the IVR promotion plays for a particular customer, the tracking component may determine if the customer followed up on the promotion by purchasing, for instance, the offered product. Likewise, the tracking component 126 may determine if an ad banner was selected for an account.

The portfolio management system 100 further includes an analysis module 130. The analysis module 130 is configured to perform multi-dimensional analysis where the results of the messaging and actions taken by the recipient can also become another dimension in the analysis. Thus, the portfolio management system 100 includes multi-dimensional analysis working in conjunction with a messaging campaign and tracking the user's actions. Other components and variations can be included around these main components.

Figure 2:
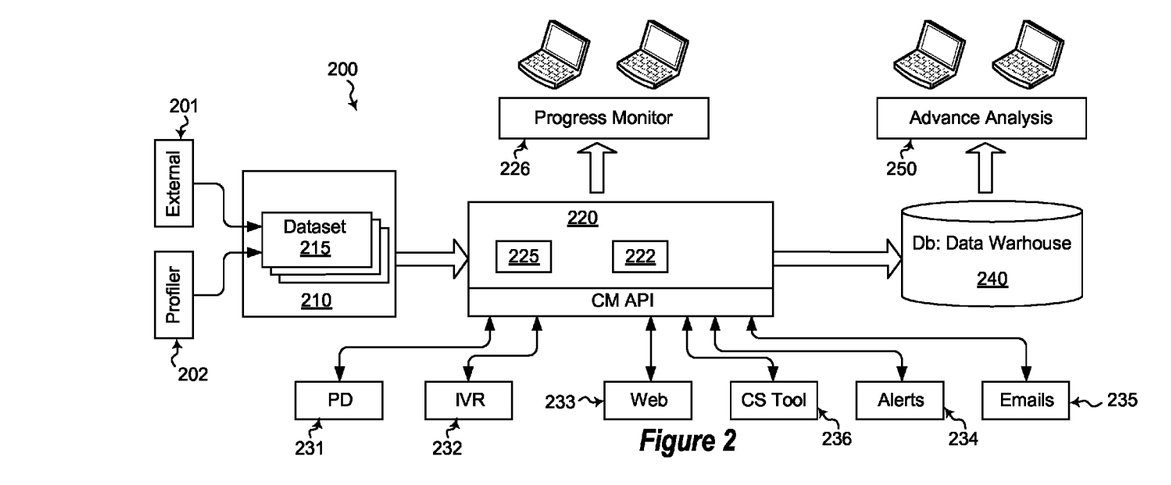
FIG. 2 illustrates an example of a portfolio management system in accordance with the embodiments disclosed herein.

Attention is now given to FIG. 2, which shows an example of a portfolio management system 200 in accordance with one embodiment of the present invention. The portfolio management system 200 may correspond to the portfolio management system 100 discussed above in relation to FIG. 1. As illustrated, the system 200 includes various modules that are configured to perform various operations as will be described. It will be appreciated that the system 200 may include more or less than the modules shown in FIG. 2 and that some modules may be part of another module.

In one embodiment, the portfolio management system 200 may access one or more external sources 201 that include information that may be used in the messaging campaign. For example, the portfolio management system 200 can use external data sources 201 for potential buyers such as from a list of phone numbers, for instance, that are targeted in a dialing campaign. The list of external sources 201 may include any source of known information such as other contact information that identifies various individuals or business and that may be used to contact the individuals or businesses.

The portfolio management system 200 may also access a profiler 202. The profiler 202, which may be external to or part of the portfolio management system 200, is configured to specify specific information about individuals, businesses, or the like that are to be subjected to the messaging campaign. In one embodiment, the profiler 202 may specify a group of people, such as targeted prepaid card holders, for instance, customers who have not performed direct deposit loads in the past, or customers who loaded for the first time in the past month, or similar targets. Thus, the profiler 202 allows the user of portfolio management system 200 the ability to enter specific information about the types of targets for a messaging campaign. In addition, the profiler 202 allows the user of portfolio management system 200 to specify the message that is to be sent as part of the messaging campaign.

The information provided by the external sources 201 and/or the profiler 202 may be accessed by a data subset selection module 210, which may correspond to the data selection module 110 discussed previously. In some embodiments, the data subset selection module 210 is configured to utilize multi-dimensional analysis of the information provided by the external sources 201 and/or the profiler 202 to create one or more datasets 215 that can be used in the messaging campaign. For instance, the data subset selection module may use the specific information from the profiler 202 and the information from the external sources 201 to specify a dataset 215 of individuals, businesses, or the like that would have the most potential to be influenced by the messaging campaign. For example, the dataset 215 may include groups of potential buyers of a particular product to send the campaign. The dataset 215 may also include individuals or businesses for use in a messaging campaign for other services. Thus, the datasets 215 will specify those targets of the messaging campaign who are most likely to be influenced by the campaign to perform the action the campaign desires such as purchasing a product or service, clicking an ad banner, calling a number, etc.

The datasets 215 may then be provided to a campaign management component 220. As discussed above in relation to campaign management module 120, the campaign management module 220 may include a campaign coordinator module 225. The campaign coordinator module 225 utilizes the datasets 215 to coordinate the sending out of the messaging campaign. That is, the campaign coordinator module 225 correlates the desired message with the desired targets using the datasets 215.

Once the correlation has been accomplished, the campaign management module 220 may use one or more communication channels or a combination of communication channels, such as the Internet, a Web communication, dialer, e-mail, alerts, customer service, postal mail, IVR, and other communication methods known in the art to transmit a message to a person, group, or other entities identified in the datasets 215. These communication channels are illustrated in FIG. 2 as postal delivery (PD) 231, IVR 232, Internet or web 233, electronic alerts 234, and email 235. As mentioned, other forms of known communication channels may also be used.

In some embodiments, the campaign management module 220 may access the customer service tools 236 to run the messaging campaign. For example, some users of portfolio management system 200 may be businesses or the like that have existing customer service systems that can be used to contact potential customers and/or receive information from the customers. Accordingly, in such embodiments the campaign management module 220 may use this existing customer service system as the communication channel for the messaging campaign.

As mentioned, a message 222 is sent to the individual, groups, businesses and the like identified in datasets 215. The message 222 will typically be specific to the communication channel being used. For instance, a message using postal mail may be in the form of a direct mailer. A message using IVR or other phone service may be an audio recording, while a web based message may be in the form of a banner ad, pop-up window, or the like. It will be appreciated that several other types of internet messages may also be sent. It will also be appreciated that other types of messages that are proper for a specific communication channel may also be sent.

The messages 222 may include an advertising pitch for a specific service or product. They may alternatively include a requirement to perform a specific task such as complete a survey, call a specific number, or click an add banner. As will be appreciated, the message 222 may include any action, advertisement, or anything else that the user of portfolio management system 200 deems worth tracking as will be explained in more detail to follow. Thus, the campaign manager 220 can promote products or a group of products or services to cross-sell or up-sell to customers.

In one embodiment, the user of portfolio management system 200 may be a provider of banking services such as prepaid debit cards or credit cards. In such embodiments, the message 222 may include a specific message such as: "Start a direct deposit and we will waive the monthly fee for 3 months." As will be appreciated, the user of portfolio management system 200 may include other message as circumstances warrant.

The portfolio management system 200 also includes a tracking module or progress monitor 226, which may correspond to the tracking module 126. Although FIG. 2 shows progress monitor 226 as being separate from the campaign manager 220, in many embodiments it will be part of the campaign manager. The tracking module 220 is configured to track the actions of the recipients of a message 222. For example, the tracking module 226 may receive input from one of the various communication channels shown in FIG. 2 or from some other communication channel. For instance, as mentioned above, if an IVR message 222 plays for a particular customer, the tracking module 226 may determine if the customer followed up on the promotion by purchasing, for instance, the offered product. Likewise, the tracking module 226 may determine if an ad banner was selected for an account.

In the embodiment described above regarding the provider of banking services such as prepaid debit cards or credit cards, the tracking module 226 can track how many direct deposit accounts were initiated after receiving the above described message. As will be appreciated, the tracking module may use the input to track any action of the recipients of a message 222 regardless of how the message 222 was sent.

The data obtained by tracking module or progress monitor 226 is provided to a data store 240, where it may be analyzed by an analysis module 250, which may correspond to the analysis module 130 previously discussed. The analysis module also accesses the datasets 215 that include information about the messaging campaign and the intended targets. The analysis module 250 uses all this information to perform multi-dimensional analysis of the messaging campaign. This multi-dimensional analysis allows the user of portfolio management system 200 to assess the effectiveness of the messaging campaign as several metrics are determined.

Figure 4:
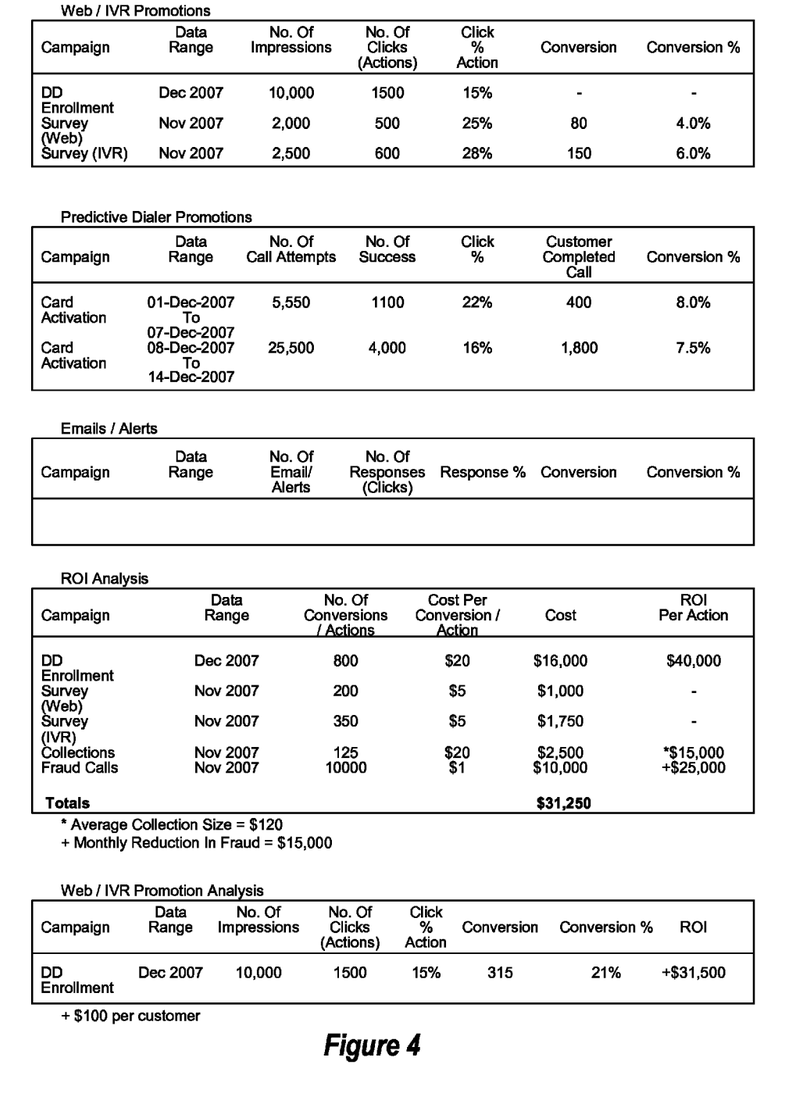
FIG. 4 illustrates sample reports from the portfolio management system.

The analysis module 250 also may generate one or more reports about the metrics that were determined in the multi-dimensional analysis. As shown in FIG. 4, the portfolio management system can generate reports based on the information gathered from tracking the user's actions. For example, Web/IVR promotions can show the type of campaign, the data range, the number of impressions, the number of clicks, the click percent, the conversion, and the conversion percent.

The predictive dialer promotions likewise can be shown in a table illustrating the campaign, the data range, the number of call attempts, the number of success, the click percent, the customer completed calls, and the conversion percent. Similar results can be shown for e-mail and alert responses. As shown in the report, the campaign, data range, number of e-mails or alerts, number of responses, response percent, conversion, and conversion percent can be provided.

The return on investment (ROI) can also be illustrated in multi-dimensional analysis report. In the ROI report, the table shows the campaign, date range, number of conversions, cost per conversion, total cost, and the ROI per action. Other totals, such as average collection size and monthly reduction in fraud, can be provided as well.

In another multi-dimensional analysis report, the Web/IVR promotion analysis can be illustrated. The report shows the campaign, the data range, the number of impressions, number of clicks, the click percent, conversion, the conversion percent, and the ROI. The report can also track the total cost per customer.

As will be appreciated, these and other reports can be generated by the analysis module 250 depending on the need and information tracked as will be understood by one of ordinary skill in the art.

As mentioned previously, the portfolio management system 200 performs multi-dimensional analysis to determine various metrics that measure the effectiveness of the messaging campaign. These metrics may be shown in the reports discussed in relation to FIG. 4. In some embodiments, the user of portfolio management system 200 may use the results of the multi-dimensional analysis when determining if a subsequent messaging campaign should be performed. For example, the user of portfolio management system 200 may determine from the multi-dimensional analysis that the messaging campaign was at least partially effective because a desired number of the targets of message 222 performed the action specified in the message such as purchasing an advertised product, filling out a survey, clicking an add banner, or the like. The user may then determine to repeat the messaging campaign to further achieve the desired results.

Likewise, the user of portfolio management system 200 may determine from the multi-dimensional analysis that the messaging campaign was not effective because the desired number of targets did not perform the action specified in the message 222. In this case, the user may determine that a different messaging campaign may need to be performed or that additional target user data is needed for further analysis. Accordingly, the multi-dimensional analysis of portfolio management system 200 may be used to create additional target user data and/or messaging campaigns.

In the embodiment described above regarding the provider of banking services such as prepaid debit cards or credit cards, the provider of the banking services may use the multi-dimensional analysis to determine if the message 222 stating "Start a direct deposit and we will waive the monthly fee for 3 months" was effective based on the number of new direct deposit accounts. If it was effective, the messaging campaign may be continued by the provider of the banking services. However, if the messaging campaign was not effective, then a new campaign may be designed and/or new target user data collected as described.

Figure 3:
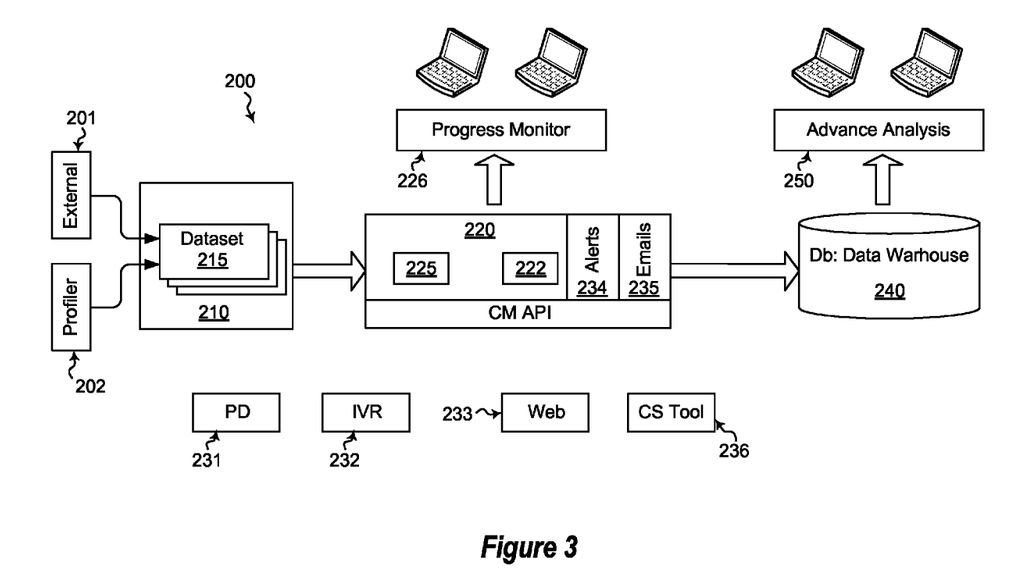
FIG. 3 illustrates an alternative example of a portfolio management system in accordance with the embodiments disclosed herein.

Attention is given to FIG. 3, which shows an alternative embodiment of portfolio system 200. In this embodiment, the alert channel 234 and the email channel 235 are part of the campaign manager 220. In this way, the campaign manager is able to directly send out alerts and emails as needed to the recipients of message 222 and/or the user of portfolio management system 200 as needed.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 5:
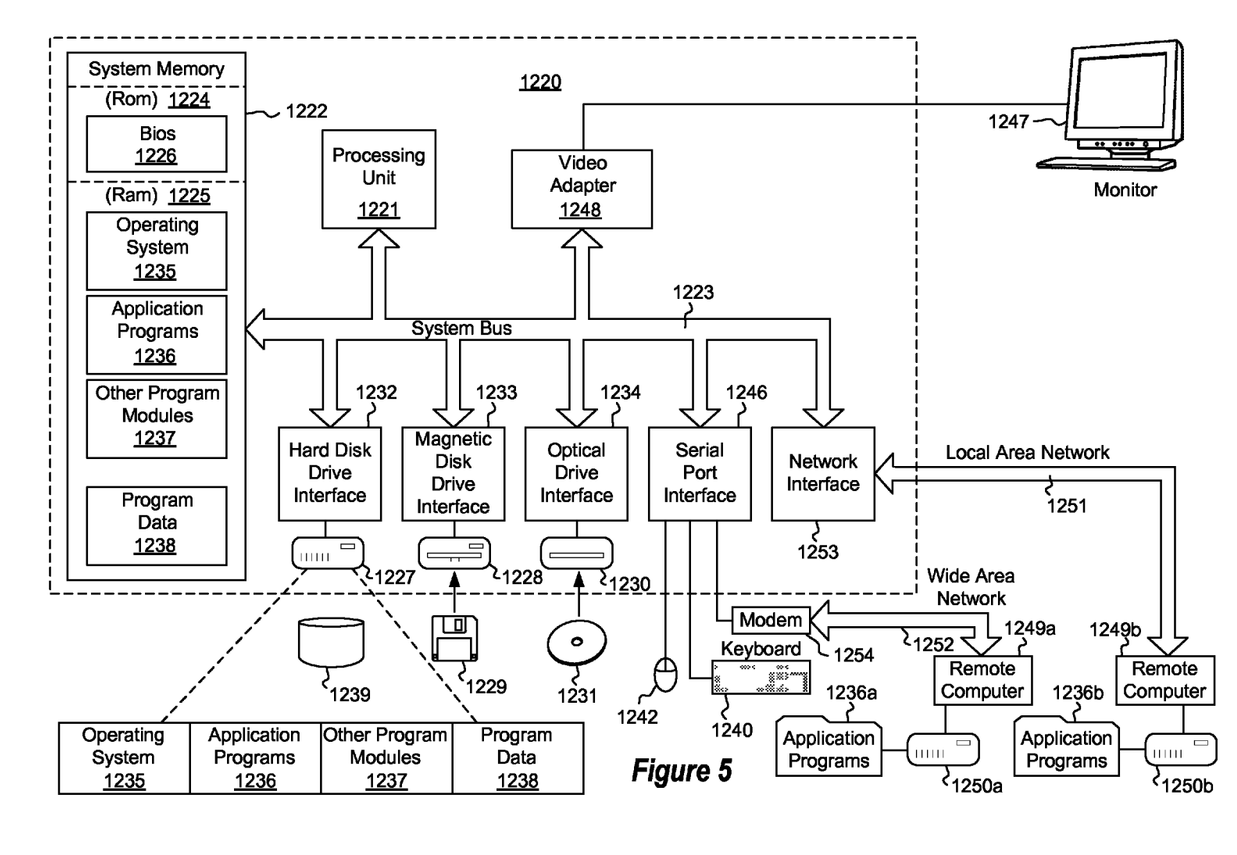
FIG. 5 illustrates an exemplary environment and system for performing the embodiments disclosed herein

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an example system for implementing the invention includes a general purpose computing device in the form of a conventional computer 1220, including a processing unit 1221, a system memory 1222, and a system bus 1223 that couples various system components including the system memory 1222 to the processing unit 1221. It should be noted however, that as mobile phones become more sophisticated, they are beginning to incorporate many of the components illustrated for conventional computer 1220. Accordingly, with relatively minor adjustments, mostly with respect to input/output devices, the description of conventional computer 1220 applies equally to mobile phones. The system bus 1223 may be any of several types of bus structures including a memory bus or memory controller, a peripheral bus, and a local bus using any of a variety of bus architectures. The system memory includes read only memory (ROM) 1224 and random access memory (RAM) 1225. A basic input/output system (BIOS) 1226, containing the basic routines that help transfer information between elements within the computer 1220, such as during start-up, may be stored in ROM 1224.

The computer 1220 may also include a magnetic hard disk drive 1227 for reading from and writing to a magnetic hard disk 1239, a magnetic disk drive 1228 for reading from or writing to a removable magnetic disk 1229, and an optical disc drive 30 for reading from or writing to removable optical disc 1231 such as a CD-ROM or other optical media. The magnetic hard disk drive 1227, magnetic disk drive 1228, and optical disc drive 1230 are connected to the system bus 1223 by a hard disk drive interface 1232, a magnetic disk drive-interface 1233, and an optical drive interface 1234, respectively. The drives and their associated computer-readable media provide nonvolatile storage of computer-executable instructions, data structures, program modules and other data for the computer 1220. Although the exemplary environment described herein employs a magnetic hard disk 1239, a removable magnetic disk 1229 and a removable optical disc 1231, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 1239, magnetic disk 1229, optical disc 1231, ROM 1224 or RAM 1225, including an operating system 1235, one or more application programs 1236, other program modules 1237, and program data 1238. A user may enter commands and information into the computer 1220 through keyboard 1240, pointing device 1242, or other input devices (not shown), such as a microphone, joy stick, game pad, satellite dish, scanner, or the like. These and other input devices are often connected to the processing unit 1221 through a serial port interface 1246 coupled to system bus 1223. Alternatively, the input devices may be connected by other interfaces, such as a parallel port, a game port or a universal serial bus (USB). A monitor 1247 or another display device is also connected to system bus 1223 via an interface, such as video adapter 1248. In addition to the monitor, personal computers typically include other peripheral output devices (not shown), such as speakers and printers.

The computer 1220 may operate in a networked environment using logical connections to one or more remote computers, such as remote computers 1249a and 1249b. Remote computers 1249a and 1249b may each be another personal computer, a server, a router, a network PC, a peer device or other common network node, and typically include many or all of the elements described above relative to the computer 1220, although only memory storage devices 1250a and 1250b and their associated application programs 1236a and 1236b have been illustrated in FIG. 12. The logical connections depicted in FIG. 12 include a local area network (LAN) 1251 and a wide area network (WAN) 1252 that are presented here by way of example and not limitation. Such networking environments are commonplace in office-wide or enterprise-wide computer networks, intranets and the Internet.

When used in a LAN networking environment, the computer 1220 is connected to the local network 1251 through a network interface or adapter 1253. When used in a WAN networking environment, the computer 1220 may include a modem 1254, a wireless link, or other means for establishing communications over the wide area network 1252, such as the Internet. The modem 1254, which may be internal or external, is connected to the system bus 1223 via the serial port interface 1246. In a networked environment, program modules depicted relative to the computer 1220, or portions thereof, may be stored in the remote memory storage device. It will be appreciated that the network connections shown are exemplary and other means of establishing communications over wide area network 1252 may be used.

The system can include many advantages, for example, in customer acquisition, cross-selling, up-selling, and customer retention. In particular, the system can be used to promote users to increase their average monthly money loaded into their card accounts. The system can help retain customers for longer periods of time by attempting to convert the customers to direct deposit customers. The system can also include features like fraud messaging and surveys.

Various components can be provided in a portfolio management system. For example, the messaging campaign can provide the user identification (ID), an action description, a start and end date, a schedule (e.g., start or end time and/or day of the week including exclusions or inclusions), communication channels, a dataset, return on investment (ROI), information regarding an action (e.g., click, call, e-mail), information regarding a conversation, the cost (per action, conversation, and/or campaign), tracking information, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of tracking performance of a messaging campaign comprising:
    identifying, by a processor, a user data set defining a group of prepaid cardholders including individuals who, in a predetermined time period, have not loaded money onto a prepaid card or loaded the money onto the prepaid card for the first time;
    developing a messaging campaign to target the prepaid card holders, the messaging campaign including at least one incentive for the prepaid cardholders to initiate a direct deposit account;
    transmitting the messaging campaign to the group of prepaid cardholders;
    tracking actions of the prepaid cardholders related to the messaging campaign; and
    determining, by the processor, effectiveness of the messaging campaign based on a number of direct deposit accounts initiated by the prepaid cardholders after receiving the messaging campaign.

2. The method in accordance with claim 1, wherein using multi-dimensional analysis to create a user data set to define a user target base comprises:
    accessing one or more external data sources that include contact information for each of the prepaid cardholders;
    accessing a profiler module that includes information specifying the at least one incentive; and
    using the information of the one or more external data sources and/or the profiler module to transmit the messaging campaign over one or more communication channel.

3. The method in accordance with claim 2, wherein the contact information of the one or more external data sources includes contact information.

4. The method in accordance with claim 2, wherein the profiler module includes further information specifying a target of the messaging campaign.

5. The method in accordance with claim 1, wherein transmitting the messaging campaign to the group of prepaid cardholders comprises:
    sending a message to each of the prepaid cardholders in the user data set, the message identifying a user action or a product advertisement that is to be tracked by the portfolio management system.

6. The method in accordance with claim 5, wherein the message is sent to the prepaid cardholders using one or more of a phone system, interactive voice response, a dialer, e-mails, alerts, Web communications, webinars, blogs, RSS feed, and postal mail.

7. The method in accordance with claim 1, wherein tracking actions of the prepaid cardholders related to the messaging campaign comprises:
    tracking the actions of the prepaid cardholders of the messaging campaign to determine a number of direct deposit accounts initiated after transmitting the messaging campaign to the group of prepaid cardholders.

8. The method in accordance with claim 1, wherein determining, by the processor, effectiveness of the messaging campaign based on a number of direct deposit accounts initiated by the prepaid cardholders comprises:

determining one or more metrics related to the effectiveness of the messaging campaign.

9. The method in accordance with claim 8, wherein the metrics include one or more of return on investment, type of messaging campaign, data range, number of impressions, number of clicks, conversion, conversion percentage, cost per customer, number of call attempts, customer completed calls, and successful calls.

10. The method in accordance with claim 1, further comprising:
performing multi-dimensional analysis of the tracked actions to determine if the messaging campaign was effective;
if the messaging campaign was effective, determining that the messaging campaign should be continued; and
if the messaging campaign was not effective, determining that a new messaging campaign should be performed.

11. A computing system, comprising:
one or more processors;
system memory;
one or more computer-readable storage media having stored thereon computer-executable instructions that, when executed by the one or more processors, causes the computing system to perform a method comprising:
identifying, by a processor, a user data set defining a group of prepaid cardholders including individuals who, in a predetermined time period, have not loaded money onto a prepaid card or loaded the money onto the prepaid card for the first time;
developing a messaging campaign to target the prepaid card holders, the messaging campaign including at least one incentive for the prepaid cardholders to initiate a direct deposit account;
tracking actions of the prepaid cardholders related to the messaging campaign; and
determining, by the processor, effectiveness of the messaging campaign based on a number of direct deposit accounts initiated by the prepaid cardholders after receiving the messaging campaign.

12. The method in accordance with claim 11, wherein using multi-dimensional analysis to create a user data set to define a user target base comprises:
accessing one or more external data sources that include contact information for each of the prepaid cardholders;
accessing a profiler module that includes information specifying the at least one incentive; and
using the information of the one or more external data sources and/or the profiler module to transmit the messaging campaign over one or more communication channel.

13. The computer system in accordance with claim 12, wherein the contact information of the one or more external data sources includes contact information.

14. The computer system in accordance with claim 12, wherein the profiler module includes further information specifying a target of the messaging campaign.

15. The computer system in accordance with claim 11, wherein transmitting the messaging campaign to the group of prepaid cardholders comprises:
sending a message to each of the prepaid cardholders identified in the user data set, the message identifying a user action or a product advertisement that is to be tracked by the portfolio management system.

16. The computer system in accordance with claim 15, wherein the message is sent to the one or more targets using one or more of a phone system, interactive voice response, a dialer, e-mails, alerts, Web communications, webinars, blogs, RSS feed, and postal mail.

17. The method in accordance with claim 11, wherein tracking actions of the prepaid cardholders related to the messaging campaign comprises:
tracking the actions of the prepaid cardholders of the messaging campaign to determine a number of direct deposit accounts initiated after transmitting the messaging campaign to the group of prepaid cardholders.

18. The method in accordance with claim 11, wherein determining, by the processor, effectiveness of the measuring campaign based on a number of direct deposit accounts initiated by the prepaid cardholders comprises:
determining one or more metrics related to the effectiveness of the messaging campaign.

19. The computer system in accordance with claim 18, wherein the metrics include one or more of return on investment, type of messaging campaign, data range, number of impressions, number of clicks, conversion, conversion percentage, cost per customer, number of call attempts, customer completed calls, and successful calls.

20. The computer system in accordance with claim 11, further comprising:
performing multi-dimensional analysis of the tracked actions to determine if the messaging campaign was effective;
if the messaging campaign was effective, determining that the messaging campaign should be continued; and
if the messaging campaign was not effective, determining that a new messaging campaign should be performed.

* * * * *